United States Patent
Hartman et al.

(10) Patent No.: US 10,274,119 B2
(45) Date of Patent: Apr. 30, 2019

(54) DOUBLE CAM LEVERS AND SAFETY LOCK FOR CAM LOCK FITTING

(71) Applicants: Jeffrey Hartman, Mobile, AL (US); George L Williamson, Fairhope, AL (US)

(72) Inventors: Jeffrey Hartman, Mobile, AL (US); George L Williamson, Fairhope, AL (US)

( * ) Notice: Subject to any disclaimer, the term of this patent is extended or adjusted under 35 U.S.C. 154(b) by 79 days.

(21) Appl. No.: 15/664,740

(22) Filed: Jul. 31, 2017

(65) Prior Publication Data
US 2018/0163908 A1    Jun. 14, 2018

Related U.S. Application Data

(63) Continuation of application No. 15/379,029, filed on Dec. 14, 2016, now Pat. No. 9,732,894.

(51) Int. Cl.
*F16L 37/18* (2006.01)
*F16L 37/20* (2006.01)

(52) U.S. Cl.
CPC ............ *F16L 37/18* (2013.01); *F16L 37/20* (2013.01)

(58) Field of Classification Search
CPC ........ B21D 139/06; B23P 19/10; F16L 37/18; F16L 37/20; F16L 37/122; F16L 37/127
USPC ................... 285/87, 88, 91, 309, 310, 311
See application file for complete search history.

(56) References Cited

U.S. PATENT DOCUMENTS

| | | |
|---|---|---|
| 3,017,203 A | 1/1962 | Macleod |
| 3,124,374 A | 3/1964 | Krapp |
| 3,383,123 A | 5/1968 | Murray |
| 3,439,942 A | 4/1969 | Moore et al. |
| 3,860,274 A | 1/1975 | Ledstrom et al. |
| 4,222,593 A | 9/1980 | Lauffenburger |
| 4,269,215 A | 5/1981 | Odar |
| 4,538,632 A | 9/1985 | Vogl |
| 4,618,171 A * | 10/1986 | Fahl ................. F16L 37/18 285/312 |
| 4,802,694 A | 2/1989 | Vargo |
| 5,234,017 A | 8/1993 | Aflin et al. |
| 5,295,717 A | 3/1994 | Chen |
| 5,338,069 A | 8/1994 | McCarthy |
| 5,435,604 A | 7/1995 | Chen |
| 5,595,217 A | 1/1997 | Gillen et al. |
| 5,791,694 A | 8/1998 | Fahl et al. |
| 5,816,623 A * | 10/1998 | Chang ................. F16L 37/18 285/88 |

(Continued)

*Primary Examiner* — James M Hewitt, II
(74) *Attorney, Agent, or Firm* — George L Williamson (57) ABSTRACT

A method and apparatus for an improved safety cam lock fitting having side by side double cam levers having outer and inner portions so that when the outer cam levers are opened and the inner cam lever remain closed, the male and female portions of the cam lock fitting only slightly separate from each other allowing the operator to quickly reclose the cam lock fitting if the operator observes that the cam lock fitting still contains pressurized material. This is accomplished by providing a larger cam lobe on the outer cam lever and a smaller cam lobe on the inner cam lever so that when the smaller cam lobe is in a closed position and protrudes into a peripheral groove on the male portion the male and female ends have a small space therein between. A lever latching mechanism may be used to prevent the cam levers from being inadvertently opened.

18 Claims, 6 Drawing Sheets

(56) References Cited

U.S. PATENT DOCUMENTS

| | | | |
|---|---|---|---|
| 5,863,079 A | 1/1999 | Donais et al. | |
| 5,904,380 A | 5/1999 | Lee | |
| 5,911,445 A * | 6/1999 | Lee | F16L 37/18 285/312 |
| 6,053,540 A * | 4/2000 | Meyer | F16L 37/18 285/312 |
| 6,095,190 A | 8/2000 | Wilcox et al. | |
| 6,543,812 B1 | 4/2003 | Chang | |
| 7,147,004 B1 | 12/2006 | Hartman | |
| 8,083,265 B1 | 12/2011 | Chen | |
| 8,123,256 B1 | 2/2012 | Hartman | |
| 8,172,271 B2 | 5/2012 | Dixon | |
| 8,632,103 B2 | 1/2014 | Fahie et al. | |
| 8,876,169 B2 | 11/2014 | Chen | |
| 8,955,885 B2 | 2/2015 | Dixon | |
| 9,562,639 B1 * | 2/2017 | Hartman | F16L 37/18 |
| 9,695,968 B1 * | 7/2017 | Hartman | F16L 37/18 |
| 9,732,894 B1 * | 8/2017 | Hartman | F16L 37/20 |
| 2016/0298799 A1 * | 10/2016 | Lee | F16L 37/18 |

\* cited by examiner

DOUBLE CAM LEVERS AND SAFETY LOCK FOR CAM LOCK FITTING

RELATED APPLICATIONS

This application is a continuation-in-part of U.S. patent application Ser. No. 15/379,029 filed Dec. 14, 2016, now U.S. Pat. No. 9,732,894.

BACKGROUND OF THE INVENTION

Field of the Invention

The present invention relates generally to cam lock fittings and, more particularly, is concerned with a cam lock fitting having a pair of double cam levers providing a safety lock and a lever latching mechanism thereon.

Description of the Related Art

Cam lock fittings having double cam levers have been described in the related art, and, cam lock fittings having safety features have been described in the related art. However, none of the related art devices disclose the unique features of the present invention. U.S. Pat. No. 4,802,694 to Vargo, dated Feb. 7, 1989, disclosed a quick-disconnect coupling. U.S. Pat. No. 8,955,885 to Dixon, dated Feb. 17, 2015, disclosed a hose coupling locking mechanism. U.S. Pat. No. 8,172,271 to Dixon, dated May 8, 2012, disclosed a hose coupling locking mechanism. U.S. Pat. No. 6,543,812 to Chang, dated Apr. 8, 2003, disclosed a self-locking quick release coupler adapted to a groove adapter. U.S. Pat. No. 5,904,380 to Lee, dated May 18, 1999, disclosed a pipe joint. U.S. Pat. No. 5,791,694 to Fahl, et al., dated Aug. 11, 1998, disclosed a lock for coupling cam arms. U.S. Pat. No. 3,439,942 to Moore, et al., dated Apr. 22, 1969, disclosed a retaining member for coupling. U.S. Pat. No. 6,095,190 to Wilcox, et al., dated Aug. 1, 2000, disclosed a coupling with a female half having internal pressure relief. U.S. Pat. No. 5,863,079 to Donais, et al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system. U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain off having down spouts. U.S. Pat. No. 4,269,215 to Odar dated May 26, 1981, disclosed a vapor flow control valve. U.S. Pat. No. 3,1860,274 to Ledstrom, et al., dated Jan. 14, 1975 disclosed a pipe coupling. U.S. Pat. No. 4,222,593 to Lauffenburger disclosed a fluid conveying coupling with safety locking device. U.S. Pat. No. 8,123,256 to Hartman dated Feb. 28, 2012 disclosed a safety lock for a cam lock fitting. U.S. Pat. No. 7,147,004 to Hartman dated Dec. 12, 2006 disclosed a check valve for a cam lock fitting. U.S. Pat. No. 3,383,123 to Murray dated May 14, 1968 disclosed a line pressure responsive safety coupling. U.S. Pat. No. 5,338,069 dated Aug. 16, 1994 to McCarthy disclosed a positively locking quick release coupling. U.S. Pat. No. 8,632,103 dated Jan. 21, 2014 to Fahie, et al. disclosed a lock for cam and groove coupler. U.S. Pat. No. 3,124,374 dated Mar. 10, 1964 to Krapp disclosed a self venting separable coupling with lock. U.S. Pat. No. 5,295,717 dated Mar. 22, 1994 to Chen disclosed a tube connecting device that disclosed a lever latching mechanism. U.S. Pat. No. 5,435,604 dated Jul. 25, 2995 to Chen disclosed a tube connecting device that disclosed a lever latching mechanism. U.S. Pat. No. 8,083,265 dated Dec. 27, 2011 to Chen disclosed a tube connecting device that disclosed a lever latching mechanism.

While these devices related to cam lock fittings may be suitable for the purposes for which they were designed, they would not be as suitable for the purposes of the present invention, as hereinafter described. As will be shown by way of explanation and drawings, the present invention works in a novel manner and differently from the related art.

SUMMARY OF THE PRESENT INVENTION

The present invention discloses an improved cam lock fitting having cooperating double cam levers which may be disposed in a side-by-side relationship and having outer and inner portions so that when the outer cam levers are opened and the inner cam lever remain closed, the male and female portions of the cam lock fitting only slightly separate from each other allowing the operator to quickly reclose the cam lock fitting if the operator observes that the cam lock fitting still contains pressurized material. This is accomplished by providing a larger cam lobe on the outer cam lever and a fork shaped smaller cam lobe on the inner cam lever so that after the outer cam lever has been opened and the smaller cam lobe is in a closed position and protrudes into the peripheral groove on the male portion, the male and female ends have a small space therein between which allows the operator to visually observe any pressurized material so that the operator can quickly reclose the fitting. Also disclosed is an embodiment which provides an automatic lever latching mechanism that must be unlatched before the cam levers can be opened thereby preventing the cam levers from being inadvertently opened.

A major problem sought to be solved by the present invention occurs at the time an operator of a conventional prior art cam lock fitting undertakes the operation of opening the fitting; at that time, the operator may not know whether the contents of the conventional fitting are still under pressure, and if the contents are still under pressure the contents will spew out when the conventional fitting is opened possibly resulting in injury to the operator or an unwanted release of materials to the environment. The present invention solves this problem by allowing the improved cam lock fitting to be only partially opened by means of a safety lock feature which allows the improved fitting to be reclosed if the operator observes that the contents inside the improved fitting remain pressurized.

An object of the present invention is to provide a cam lock fitting having a pair of cooperating double cam lock levers thereon. A further object of the present invention is to provide a safety lock which can be easily operated by a user as a part of the normal operation of a cam lock fitting. A further object of the present invention is to provide a safety lock which will remain locked when the cam lock fitting is pressurized. A further object of the present invention is to provide a safety lock on a cam lock fitting which will prevent inadvertent pressurized discharges of environmentally damaging material from the cam lock fitting. A further object of the present invention is to provide a safety lock on a cam lock fitting which is simply constructed and which can be relatively inexpensively manufactured. A further object of the present invention is to provide a cam lock fitting having a pair of cooperating double cam lock levers having a lever latching mechanism thereon.

A major advantage of the preset invention is that the cam members are disposed substantially 180 degrees apart and therefore all forces related to associated stress or torque resulting from using the cam members are evenly distributed around a cam lock fitting designed according to the teachings of the present invention. Conventional cam lock fittings using side-by-side cam members would not be expected to exhibit this characteristic.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

REFERENCE NUMERALS

With regard to reference numerals used, the following numbering is used throughout the drawings.

10 prior art cam lock fitting
12 female end portion
14 male end portion
16 front end
18 hose
20 band clamp
22 rear end
24 cam lever/ear
26 lever portion
28 cam portion
30 groove
32 opening
34 wall of cam lock fitting
36 axle
38 flange
40 gasket
42 boss
44 boss
46 centerline
48 double lever cam lock
50 double lever cam lock
54 cam lock fitting
56 female end portion/conduit
58 male end portion/conduit
60 front end
62 outer cam lever/ear
64 inner cam lever/ear
66 lever portion
68 cam lobe portion
70 lever portion
72 cam lobe portion
74 axle
76 aperture of cam lobe
78 boss
80 boss
82 aperture of boss
84 rear end
86 groove
88 opening
90 axle
92 aperture
94 aperture
98 circular gasket/seal
100 inside
102 wall 104 flange
106 space
108 arrow
110 cutout/space
112 rear portion
113 lever latching mechanism
114 pull ring member
116 end of pin
118 pin
120 aperture of pin
122 housing for pin
124 tip end of pin
126 inclined surface of pin
128 retaining protrusion
130 retaining protrusion
132 spring biasing member
134 finger of user
136 space
138 alternative embodiment double lever cam lock
140 alternative embodiment double lever cam lock
142 larger cam member with larger arm
144 smaller cam member with smaller arm
146 cylindrical spacer
147 latch mechanism
148 latch lever/arm
150 pivot
152 spring biasing means
154 thumb grip
156 first catch for outer ear
158 second catch for inner ear
160 cam member
162 cam member
164 boss
166 mount

DETAILED DESCRIPTION OF THE PREFERRED EMBODIMENT

The following discussion describes in detail at least one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-30 illustrate the present invention wherein a cam lock fitting having a pair of double cam levers which cooperate to provide a safety locking mechanism is disclosed.

Figure 1:
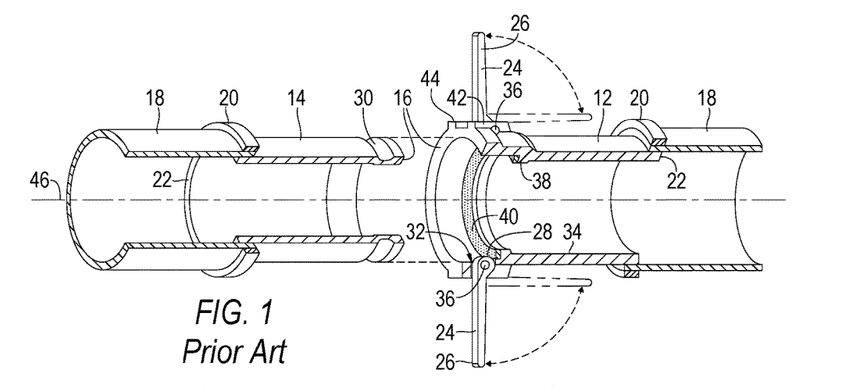
FIG. 1 is a perspective view of a prior art cam lock fitting.

Turning to FIG. 1, therein is shown a prior art version of a conventional cam lock fitting generally indicated by reference number 10 having a female end coupling portion or conduit 12 and a male end coupling portion or conduit 14 each having a front end 16 which when joined together form a conduit through which fluid or the like will flow. A hose 18 having a band clamp 20 thereon is attached to a rear end 22 of each female 12 and male 14 portions; hose 18 ranges in size from about one inch to about 8 inches and are generally heavy for accommodating relatively high pressure. The female portion 12 has a pair of cam levers or ears 24 each having a lever portion 26 and a cam portion 28 thereon, which cam portion locks the female end 12 to the male end 14 by seating the cam portion 28 of the female portion within a peripheral groove 30 on an exterior of the male portion so that the two portions 12, 14 with hoses 18 are joined together to form a conduit so that materials can pass therethrough. The cam portion 28 projects through an opening 32 in the wall 34 near the front end 16 of the female portion 12 as the ears 24 pivot on axles 36. Direction arrows are used to show movement of ears 24 between a closed position lying substantially parallel to and adjacent the female portion 12 and an open position outwardly moved away from the female portion 12 so as to disengage the cam portion from groove 30. Also shown on the inside of the female portion 12 is annular flange 38 having a flexible circular gasket or O-ring seal 40 therein wherein the flange and gasket extend entirely around the internal periphery of the female portion for making sealing contact with the end 16 of the male end portion 14 in a conventional manner. The ears 24 are each mounted onto an axle 36 extending through first, left and second, right bosses 42, 44 disposed on opposite sides of the female coupling 12. Centerline 46 of cam lock fitting 10 is also shown. A major disadvantage of the prior art cam lock fitting 10 is that it is designed to be either completely closed or completely open and therefore offers no safety locking mechanism.

Figure 2:
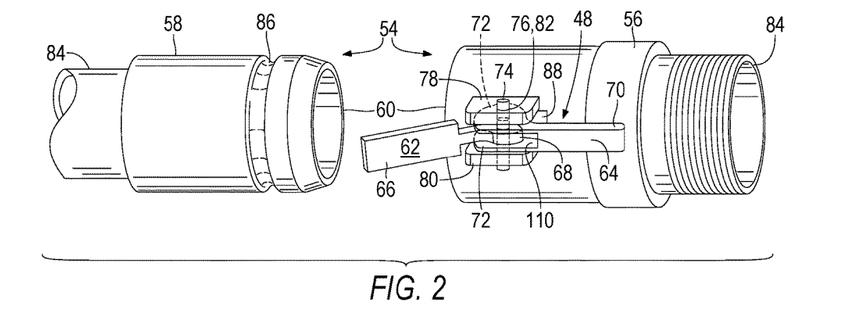
FIG. 2 is a perspective view of a first embodiment of the present invention.
Figure 3:
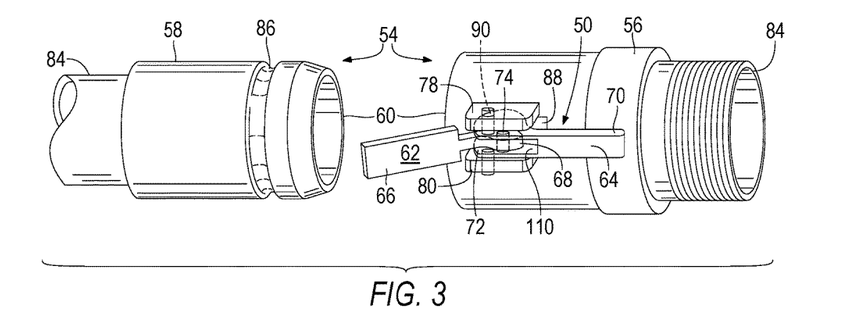
FIG. 3 is a perspective view of a second embodiment of the present invention.

Turning to FIGS. 2-3, therein are shown two embodiments 48, 50 of an improved cam lock fitting 54 of the present invention wherein FIG. 2 shows embodiment 48 and FIG. 3 shows embodiment 50. FIGS. 2-3 show a cam lock fitting 54 similar in some respects to the prior art cam lock fitting 10, shown in FIG. 1, but with important differences due to the embodiments 48, 50 mounted thereon. Therein is shown a cam lock fitting 54 having a female end coupling portion or conduit 56 and a male end coupling portion or conduit 58 each having a front end 60 which when joined together form a conduit through which fluid or the like will flow. The present invention operates similarly to the prior art am lock fitting 10 shown in FIG. 1 except that there are a total of four cam levers (i.e., two pairs of double cam levers/ears) instead of two cam levers wherein the double cam levers cooperate with each other to provide a safety lock. Each of the cam lock fittings 54 shown in FIGS. 2-3 are similar to each other, however, different embodiments 48, 50 of cam lock levers are mounted thereon.

Figure 18:
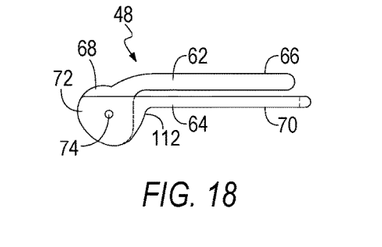
FIG. 18 is a side elevation view of the double cam lever of an alternative embodiment of the present invention.

Turning to FIG. 2, therein is shown the preferred embodiment 48 having a pair of double cam levers or members 62, 64 mounted on opposite sides of the female end portion 56 wherein each pair has an outer cam lever 62 and an inner cam lever 64. Outer cam lever 62 has a lever portion 66 and an eccentric cam lobe portion 68, and, inner cam lever 64 also has a lever portion 70 and first and second eccentric cam lobe portion 72 wherein the first and second cam lobe portions form the two prongs of a fork shaped portion being spaced apart a distance thereby creating a cutout or space 110 sufficient to allow the cam lobe portion 68 to fit therein between the two prongs which causes the inner and outer cam levers 62, 64 to be disposed symmetrically about the female end portion 56 which assures smooth operation throughout the life span of a cam lock fitting 54 made according to the teachings of the present invention. The cam lobe portion 72 resembles a fork shape when viewed from the top (see FIG. 19) wherein the two similar first and second prongs/branches of the fork have cam lobe 68 disposed therein between in space 110; of course, the positions of the lobes 68, 72 could be reversed relative to each other wherein the larger lobe portion 68 could be manufactured as the forked portion 72 so that the smaller lobe portion would be disposed on the inside of the larger forked portion as shown in FIG. 18. The lever portion 66 of the outer cam ear 62 is larger, i.e., wider, than the lever portion 70 of the inner cam ear 64 so that it will be easier to grasp in the hands of an operator; also, the inner cam ear is not intended to be opened until after the outer cam ear is opened and having a wider outer ear helps accomplish this objective. A lever latching mechanism 113 for use with lever 62, 64 is described in FIGS. 20-24.

A single axle 74 passes through a substantially centrally disposed aperture 76 of cam lobe portion 68, 72 and the ends of the axle are carried on first and second bosses 78, 80 by passing through an aperture 82 of each boss. The male and female end portion 56, 58 each have a rear end portion 84 and the male end portion has an external peripheral groove 86 thereon. The female end portion 56 has openings 88 in the opposing walls thereof through which cam lobes 68, 72 pass. Cam lobe portion 68 of outer cam ear 62 is configured differently and may be larger than cam lobe portion 72 of inner cam ear 64, as best shown on FIGS. 8-10 and FIG. 16, so that when the outer and inner ears 62, 64 are closed the cam lobe portion 68 fits in or engages groove 86 so as to completely sealingly close or connect the male end portion 58 to the female end portion 56 because cam lobe 68 is substantially the same size and shape of the groove 86. This is due to cam lobe 68 being effectively configured, in size or shape, so as to engage groove 86 in such a way to cause the end 60 of male conduit 58 to move axially into a sealing position relative to the sealing gasket inside female conduit 56. In contrast, when the outer cam ear 62 with cam lobe 68 is opened and the smaller cam lobe 72 is unopened, the male end portion 58 becomes slightly loosened or separated from the female end portion 56 to allow a space to form between the front end 60 of the male end portion 58 and the female end portion 56 as best shown and explained relative to FIGS. 8-13, because smaller cam lobe 72 being smaller, i.e., being configured differently, than groove 86 doesn't completely fill groove 86 being loose fit thereby causing a slight space to form between front end 60 and the female end portion 56 as previously disclosed.

In summary of FIGS. 2-3, the female portion 56 has a pair of double cam levers or ears 48, each having an outer and inner lever portion 66, 70 and a cam portion 68, 72 thereon, which cam portion locks the female end 56 to the male end 58 by seating the cam portions 68, 72 of the female portion within a groove 86 on the male portion so that the two portions are joined together. The cam portions 62, 64 project through an opening 88 in the wall near the end 60 of the female portion 56 as the ears 62, 64 pivot on axle 74. Also included in the female portion 56 is a gasket or O-ring seal 98 therein wherein the gasket extends entirely around the internal periphery of the female portion for making sealing contact with the end 60 of the male end portion 58 in a conventional manner as shown in FIGS. 8-13. The ears 62, 64 are each mounted onto an axle 74 extending through a first and second boss 78, 80 mounted on opposite sides of female coupling 56. The inner and outer ears 62, 64 each move between a first downward closed position lying substantially parallel to and adjacent the female portion 56 to a second upward open position outwardly moved away from the female portion so as to disengage the cam portion 68, 72 from groove 86.

In order for an operator to open a cam lock fitting 54 designed according to the teachings of the present invention, the operator must first move the outer cam lever 62 from the first downward closed position to the second upward open position so that larger cam lobe 68 is moved away from groove 86 so as to partially open the cam lock fitting 54 so as to partially relieve internal pressure contained inside the cam lock fitting. If there is no pressure remaining in the cam lock fitting 54 the operator can continue with the next step of opening the second inner cam lever 64 to thereby separate the male and female conduit portions 58, 56 just as previously explained relative to embodiment 48 of FIG. 2. However, if there is still pressure inside the cam lock fitting 54 when the first outer cam lever 62 is opened, the operator will immediately reclose that first outer cam lever 62 so as to pull the male end portion 58 back into the locked position inside female end portion 56 so as to reclose and reseal the cam lock fitting. Pressure remaining inside cam lock fitting 54 could be indicated by the sound of escaping gas, a hissing sound, seepage, leaking or gurgling liquid or the like.

Figure 6:
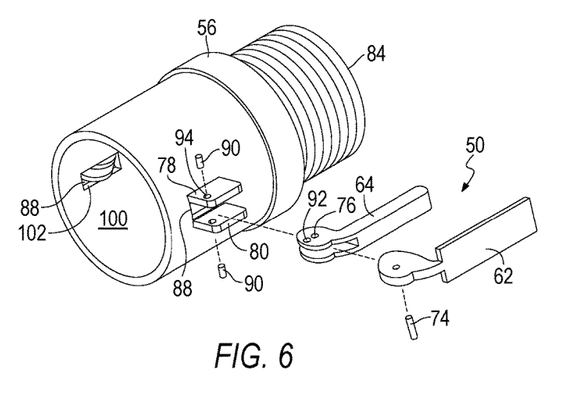
FIG. 6 is an exploded perspective view of a second embodiment of the present invention.

Turning to FIG. 3, therein is shown a view similar to FIG. 2 except that another embodiment 50 of the double cam lever is shown having double axles 74, 90. The female and male end portions 56, 58 are essentially the same as shown in FIG. 2 with the main difference being that inner cam ear 64 is mounted onto bosses 78, 80 using axle 90 in aperture 92 which axle 90 is offset from the center of lobe 72 toward the front end 60 of the female end portion 56 so as to be disposed toward the front ends of bosses 78, 80 in aperture 94 as best shown on FIGS. 6-7. Axle 90 and apertures 92,94 are co-aligned as shown in FIG. 6. In this configuration, while outer cam ear 62 pivots on substantially centrally disposed axle 74 on cam lobe 72, it is carried with and moves outwardly with inner cam ear 64 by having cam lobe portion 72 pivot on offset axle 90 which is better illustrated in FIGS. 6-7 and 11-13. The operation of embodiment 50 is similar to embodiment 48 and the steps of operation have been previously disclosed relative to embodiment 48 of FIG. 2.

Figure 4:
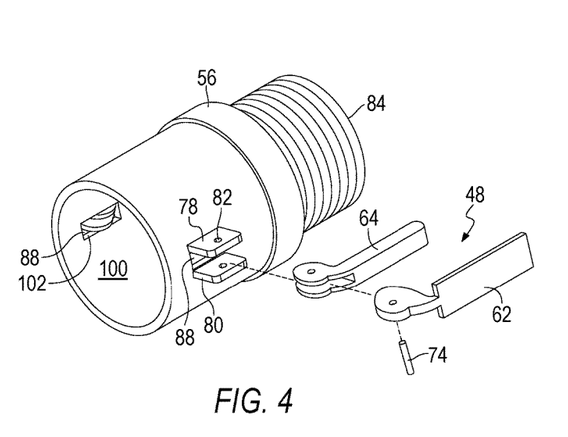
FIG. 4 is an exploded perspective view of a first embodiment of the present invention.

Turning to FIGS. 4 and 6, the two embodiments 48, 50 of an improved cam lock fitting of the present invention are exploded away from a female end portion 56; wherein FIG. 4 shows embodiment 48 and FIG. 6 shows embodiment 50. Shown therein is the inside 100 of the female coupling 56 along with the double cam levers 48, 50 on opposite sides of the female end portion 56 showing the bosses 78, 80 on the female coupling 56. Note that the openings 88 are sized and shaped to accommodate movement of the cam lobes of the present invention. The bosses 78, 80 are attached onto the outside of the female coupling 56 in the conventional manner. Previously disclosed elements are also shown as were discussed relative to the respective embodiments 48, 50 of FIGS. 2-3.

Figure 5:
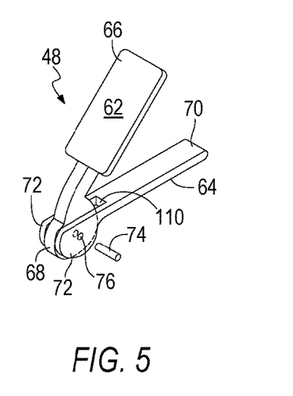
FIG. 5 is a perspective view of the double cam lever of a first embodiment of the present invention.
Figure 7:
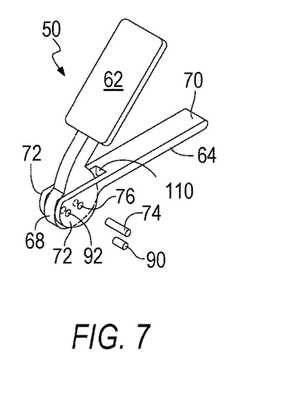
FIG. 7 is a perspective view of the double cam lever of a second embodiment of the present invention.

Turning to FIGS. 5 and 7, an enlarged view of the cam portions of the two embodiments 48, 50 are shown illustrating the features of the two embodiments as previously disclosed relative to the respective embodiments 48, 50 of FIGS. 2-3. FIG. 5 shows single axle embodiment 48 and FIG. 7 shows a double axle embodiment 50. Previously disclosed elements are also shown as were discussed relative to the respective embodiments 48, 50 of FIGS. 2-3.

Figure 8:
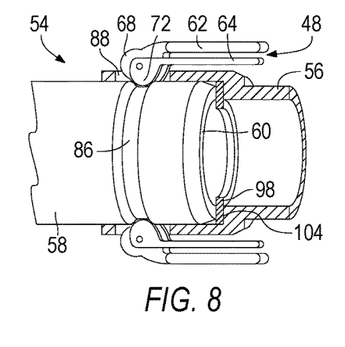
FIGS. 8-10 are sectional views of a first embodiment of the present invention with certain parts shown in perspective for ease of illustration.
Figure 9:
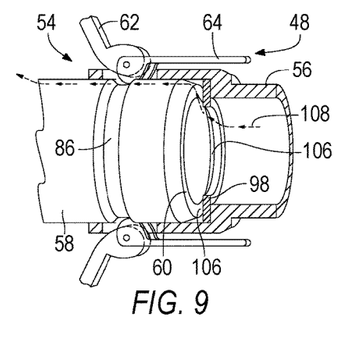
Figure 10:
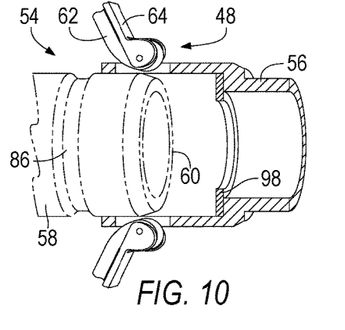
Figure 11:
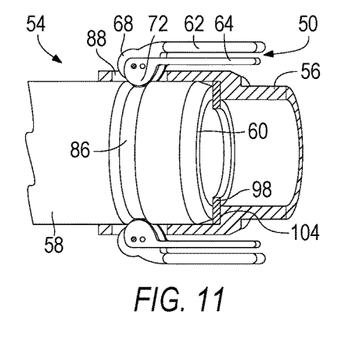
FIGS. 11-13 are sectional views of a second embodiment of the present invention with certain parts shown in perspective for ease of illustration.
Figure 12:
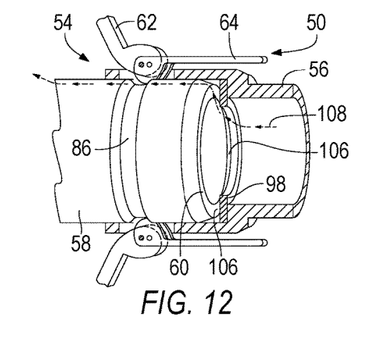
Figure 13:
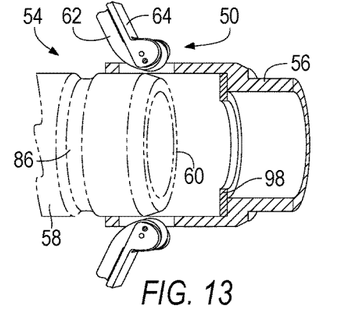

Turning to FIGS. 8-13, therein is shown the steps of operation of the two embodiments 48, 50 of an improved cam lock fitting 54 designed according to the teachings of the present invention wherein FIGS. 8-10 shows embodiment 48 and FIGS. 11-13 shows embodiment 50. For each embodiment 48, 50 therein is shown the movement of the male end portion 58 relative to the female portion 56 as the cam lock fitting 54 of the present invention is being opened; the steps would be reversed for closure of the cam lock fitting. FIGS. 8 and 11 show the male end portion 58 connected to and mated tightly to the female portion 56 as would be the condition when the cam lock fitting 54 is in a sealed position with double cam lever 62, 64 in a downward closed position so that the end 60 of the male end portion 58 is tightly sealingly engaged against the front side of circular gasket 98 of the female end portion 56 with the lobes 68, 72 in groove 86; also, the rear side of gasket 98 is tightly sealed against the front surface of the inner flange 104 of the female end portion 56.

In contrast, FIGS. 9 and 12 shows the larger cam lobe of outer cam lever 62 in the open position and shows the smaller cam lobe 72 of inner cam lever 64 remaining in the groove 86 and also shows the male end portion 58 with a small space 106 being defined in between its end 60 and the gasket 98 which would occur when the outer cam lever 62 is in an upward open position which would cause the ends 60 of female end portion 56 and male end portion 58 to slightly separate thereby allowing the release of pressure or a small amount of material as indicated by arrows 108 from the inside of the female portion 56 of the cam lock fitting 54. Arrows 108 illustrate material/fluid moving into space 106 and then out the fitting 54 by escaping between the male and female couplings 58, 56. FIGS. 10 and 13 illustrate that the male end 58 can only be completely released from the female end 56 when the outer and inner cam levers 62, 64 are moved to the open position and when this occurs, each of the lobes 68, 72 become disengaged from groove 86 to allow the male 58 and female 56 end to be completely separated from each other. Previously disclosed elements may also be shown.

Figure 14:
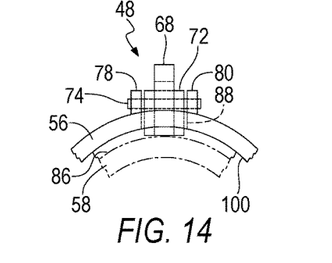
FIG. 14 is an end elevation view taken from the front of portions of a first embodiment of the present invention.
Figure 15:
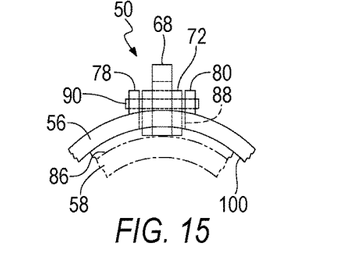
FIG. 15 is an end elevation view taken from the front of portions of a second embodiment of the present invention.

Turning to FIGS. 14-15, the two embodiments 48, 50 of an improved cam lock fitting of the present invention are shown mounted on a female end portion 56 also showing portions of the male end portion 58 along with groove 86 in phantom line; wherein FIG. 14 shows embodiment 48 and FIG. 15 shows embodiment 50. Shown therein is the inside 100 of the female coupling 56 along with the double cam levers 48, 50 on one side only of the female end portion 56 showing the bosses 78, 80 on the female coupling 56. Note that the openings 88 are sized and shaped to accommodate movement of the cam lobes of the double levers of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80 are attached onto the outside of the female coupling 56 in the conventional manner. In FIG. 15, the axles 74, 90 lie in the same horizontal plane and therefore only the front axle 90 is visible in aperture 92 in this drawing. Previously disclosed elements may also be shown as were discussed relative to the respective embodiments 48, 50 of FIGS. 2-3.

Figure 16:
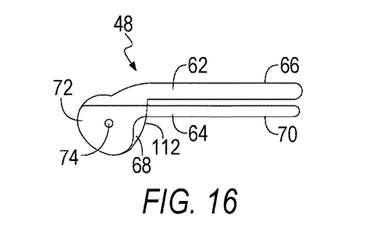
FIG. 16 is a side elevation view of the double cam lever of a first embodiment of the present invention.
Figure 17:
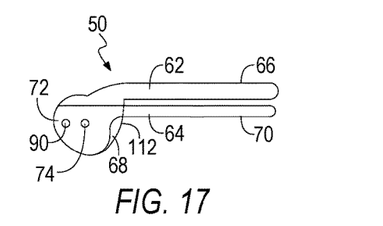
FIG. 17 is a side elevation view of the double cam lever of a second embodiment of the present invention.

Turning to FIGS. 16-17, an enlarged view of the double cam levers/ears of the two embodiments 48, 50 are shown illustrating the features of the two embodiments as previously disclosed relative to the respective embodiments 48, 50 of FIGS. 2-3. FIG. 16 shows embodiment 48 and FIG. 17 shows embodiment 50. In FIGS. 16,17, cam lobe 68 of outer cam ear 62 is larger, i.e., having a larger radius on its rear peripheral portion 112 which is visible when closed, than cam lobe 72 of inner cam ear 64 as shown at 112. Regarding FIGS. 16-17, because cam portion 68 has a larger radius on its rear portion 112 than cam portion 72, as measured at its horizontal plane through its central axle, it therefore effectively and substantially fills or engages the complimentarily sized groove 86 causing a complete seal between the gasket 98 and the male end portion 58 as shown in FIGS. 8 and 11; however, after the outer cam lever/ear 68 has been opened and when the smaller cam lobe portion 72 protrudes into groove 86 it doesn't completely fill the groove so the space 106 is formed as shown in FIGS. 9 and 12 between the end 60 of the male end 58 and the gasket 98 of the female end portion 56. FIGS. 10 and 13 show the female 56 and male 58 ends completely separated with cam lever/ears 62, 64 in the open position.

Figure 25:
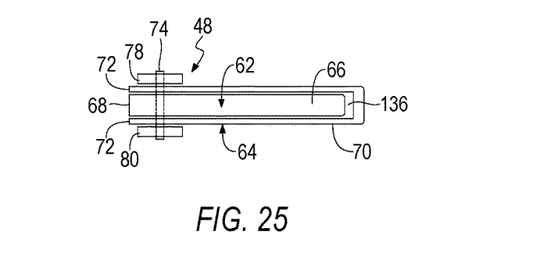
FIG. 25 is a top view of the double cam lever of an alternative embodiment of the present invention.

Turning to FIG. 18, therein is shown an alternative embodiment of the present invention showing the inner cam lever 64 being larger on its rear peripheral portion 112 than the outer cam lever 62. Previously disclosed elements are also shown. FIG. 25 shows a top view of the alternative embodiment of FIG. 18 showing the inner cam lever 64 being larger than the outer cam lever 62.

Figure 19:
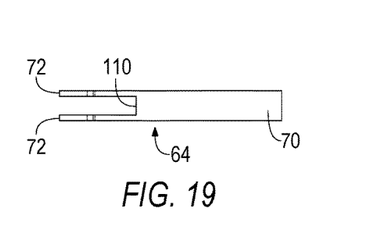
FIG. 19 is a top view on the inner cam lever of a first embodiment of the present invention.

Turning to FIG. 19, therein is shown a top view of the inner cam lever 64 of the first embodiment of the present invention showing previously disclosed elements. Space/cutout 110 between the prongs of the forked ends of the cam lobe portions 72 is also shown. It can be seen that the cam lobe portions 72 form the prongs of the forked portion.

With reference to FIGS. 1-19, the cam members 62, 64 pivot substantially parallel to the centerline of the cam lock fitting/coupling 54 with the axles 74, 90 being substantially perpendicular to the centerline, and, the cam members are disposed on the bosses 78, 80 so that the cam lobes 68, 72 and the axles will be properly operationally aligned with the groove 86 as required by each embodiment 48, 50 all of which would be understood by one skilled in the art. The axles 74, 90 may be hollow pins, roll pins or the like. Cam members 62, 64 are disposed substantially 180 degrees apart on opposite sides of the female conduit 56 and therefore all mechanical forces related to associated stresses or torque resulting from operation of the cam members are evenly distributed around the cam lock fitting 54. This will prevent warping of the elements of the present invention 10 over time.

Figures 20, 21, 22, 23, 24:
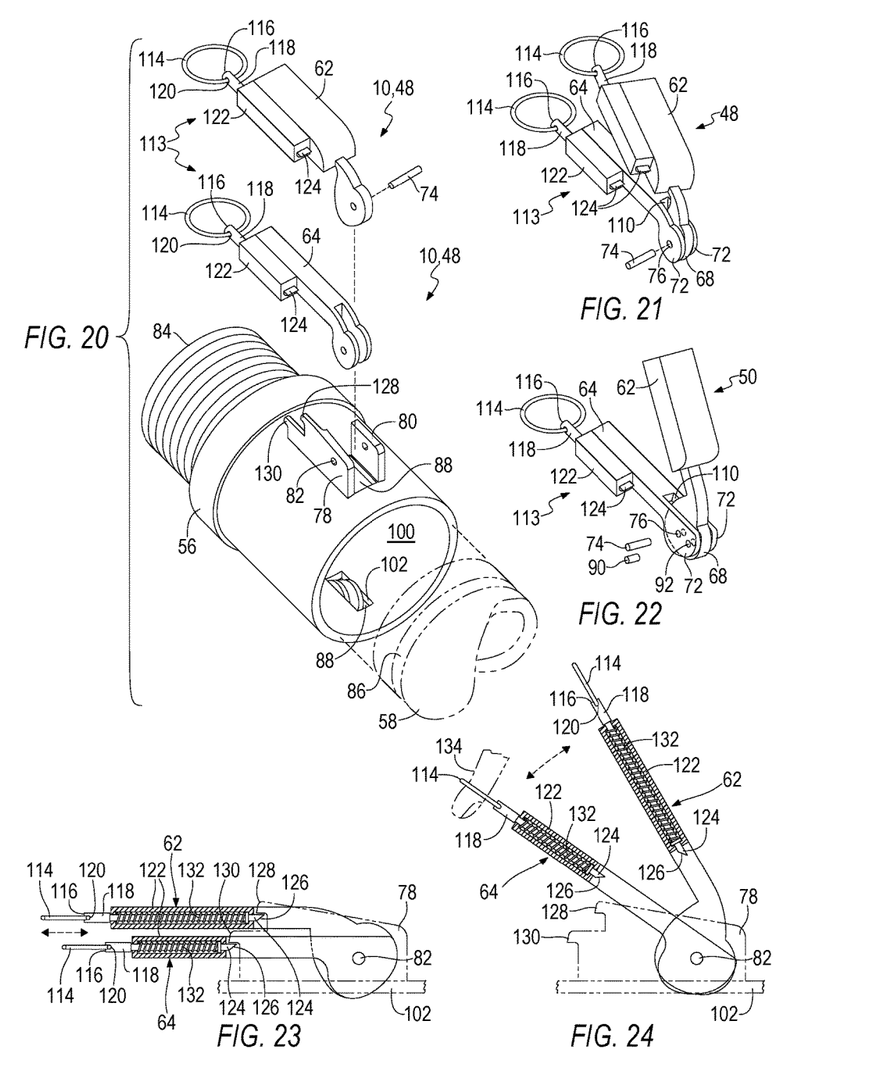
FIG. 20 is an exploded perspective view of a lever latching embodiment of the present invention.
FIG. 21 is a perspective view of a lever latching embodiment of the present invention.
FIG. 22 is a perspective view of an alternative lever latching embodiment of the present invention.
FIGS. 23-24 are side elevation views of a lever latching embodiment of the present invention with certain parts shown cut-away for ease of illustration.

Turning to FIGS. 20-24, therein is shown an embodiment of the present invention 10 which provides an automatic lever latching mechanism disposed on levers 62, 64, generally indicated by reference numeral 113, so that when the levers 62, 64 are moved from an open position into a closed position they become automatically latched in the closed position so that before an operator opens the levers he will have to use a pull ring 114 or the like in order to open the first and second levers 62, 64, or as shown in FIG. 22, he would use the pull ring 114 to open only one lever which would have the lever latching mechanism 113 thereon. In either embodiment, the operator would have to operate a lever latching mechanism 113 before he could open the levers 62, 64 thereby preventing the cam levers from being inadvertently opened. Inner lever 64 is shorter than outer lever 62 for convenience and ease of operation by the operator/user. Previously disclosed elements are also shown as were discussed relative to the respective embodiments 48, 50 of FIGS. 2-3.

Continuing with FIGS. 20-24, therein is shown the present invention 10 having a pair of double cam levers 62, 64 mounted on opposite sides of the female end portion 56 wherein each pair has an outer cam lever 62 and an inner cam lever 64. Outer cam lever 62 has a lever portion 66 and an eccentric cam lobe portion 68, and, inner cam lever 64 also has a lever portion 70 and first and second eccentric cam lobe portions 72 wherein the first and second cam lobe portions are fork shaped and spaced apart a distance thereby creating a cutout 110 or space sufficient to allow the cam lobe portion 68 to fit therein between which causes the inner and outer cam levers 62, 64 to be disposed symmetrically about the female end portion 56 which assures smooth operation throughout the life span of a cam lock fitting 54 made according to the teachings of the present invention 10. FIGS. 20, 21, 23 and 24 discloses embodiment 48 which uses a single axle 74 whereas FIG. 22 discloses embodiment 50 which uses double axles 74 and 90.

Turning to FIG. 20, therein is shown the present invention 10 exploded away from the female end portion 56 and incorporates embodiment 48. Shown therein is the inside 100 of the female coupling 56 along with the double cam levers 48 on opposite sides of the female end portion 56 showing the bosses 78, 80 on the female coupling 56. Note that the openings 88 are sized and shaped to accommodate movement of the cam lobes of the present invention. The bosses 78, 80 are attached onto the outside of the female coupling 56 in the conventional manner. Male end portion 58 is also partially shown in phantom line. Previously disclosed elements are also shown as were discussed relative to the respective embodiments 48, 50 of FIGS. 2-3.

Also shown in FIG. 20, is a pull ring 114 attached to an end 116 of a pin 118 wherein the pull ring passes through a slot or aperture 120 on an end of the pin which pin is slidably disposed in a housing 122 attached onto a side of lever 62, 64 so that each lever 62, 64 has a housing 122 and a pin 118 mounted thereon. Pull ring 114 may be a multi-turn wire ring being useful for manipulating levers 62, 64. Note that the pin 118 is mounted inside the housing 122 so as to be slidably disposed in the housing so that the pin slides along the longitudinal axis of the levers 62, 64. The pin 118 also has a second end or tip 124 having an inclined surface 126 thereon. The pin 118 extends along and is slidable along an axis of a respective lever 62, 64 so that when the levers 62, 64 are in a closed position the tip 124 of pin 118 latches underneath the rear portion of upper and lower corresponding retaining protrusions 128, 130 disposed on a rear portion of boss 78 as best seen in FIG. 23.

Continuing with FIGS. 20-24, when the respective pull rings 114 of levers 62, 64 are pulled rearwardly toward end 84 of female conduit 56 in the direction along the axis of the pin 118, the pin 118 is moved in a bore within the housing 122 against the biasing member, being spring 132, as would be understood by one skilled in the art. In operation, when the levers 62, 64 are pivoted from the open position to the locking position the inclined surface 126 of the tip of the pin 124 of each pin 118 eventually abuts against the rear upper surface of retaining protrusion 128, 130 of the respective retaining protrusions so that the tip 124 of the pin moves downwardly across the surface of the respective retaining protrusions 128, 130 due to further pivoting movement of the corresponding lever 62, 64 so that the tip 124 of pin 118 becomes eventually positioned underneath the respective retaining protrusions 128, 130 as the pin tip 124 is forced to be extended from the housing 122 due to the action of the internal spring 132 shown on each lever 62, 64 as best seen in FIG. 23. In operation, when the operator desires to disengage or to open the levers 62, 64 and move them from a closed position to an open position the pull rings 114 are pulled toward the rear to retract the respective tips 124 of pins 118 in levers 62, 64 back into the housing 122 against the biasing action of the springs 132 so that the tips of pin 124 become disengaged from underneath the rear of the respective retraining protrusions 128, 130 so that the levers 62, 64 can then be pivoted upwardly to an unlocked position so that the couplings 56, 58 of the present invention 10 can be disengaged as best seen in FIG. 24. In this manner, the male coupling 58 and female coupling 56 can become separated or disconnected, all of which would be understood by one skilled in the art.

Turning to FIG. 21, therein is shown the embodiment 48 which has been previously disclosed in relation to FIG. 5 of the present invention 10 shown in combination with the previously disclosed lever latching mechanism 113.

Turing to FIG. 22, therein is shown the embodiment 50 which has been previously disclosed in relation to FIG. 7 of the present invention 10 shown in combination with the previously disclosed lever latching mechanism 113.

Turning to FIGS. 22-24, therein are shown partially cut-away side views of the present invention 10 showing pull rings 114 disposed on respective levers 62, 64 being attached through an aperture 120 in the end of respective pins 118 also showing the housing 122 along with the biasing spring 132, or the like, wherein the tips 124 of the pin are shown along with the inclined surface 126 and respective retaining protrusions 128, 130 disposed on boss 78. FIG. 23 shows the levers 62, 64 in a closed position similar to FIG. 8, and, FIG. 24 shows the levers 62, 64 in an open position similar to FIG. 10 wherein the pull rings 114 of the levers 62, 64 have been operated and moved by a finger 134 of an operator/user so that the tips of the pin 124 are no longer captured underneath the corresponding retaining protrusions 128, 130 of the bosses 78. Inner lever 64 is shorter than outer lever 62 for convenience and ease of operation by the operator/user. Levers 62, 64 are configured so that the tip 124 of lever 64 mates with the retaining protrusion 130 and the tip 124 of lever 62 mates with retaining protrusion 128. Direction arrows are shown in certain figures to indicate movement of the elements.

Turning to FIG. 25, therein is shown a top view of the alternative embodiment showing the inner cam lever 64 being larger than the outer cam lever 62 as was previously disclosed with respect to FIG. 18. It can be seen that inner arm 64 is configured, sized and shaped so that it can be moved from the closed position to the open position without touching or interference from the outer arm 62. This is accomplished by providing a space 136 between inner arm 64 and outer arm 62 which allows inner arm 64 to substantially surround outer arm 62 so that the inner arm can be operated without moving the outer arm. It can be seen that the longitudinal central axis of the outer and inner cam levers 62, 64 are co-aligned so that the axis of the outer lever is directly above the axis of the inner lever.

Figure 26:
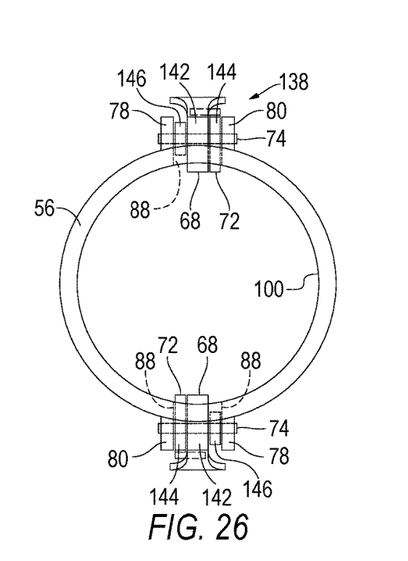
FIG. 26 is an end elevation view of the double cam levers taken from the front of portions of an alternative embodiment of the present invention.
Figure 28:
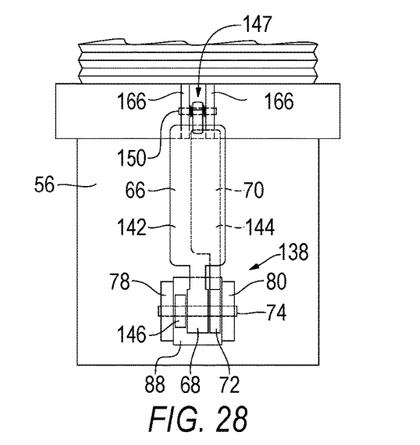
FIG. 28 is a top view of the double cam lever of an alternative embodiment of the present invention.
Figure 30:
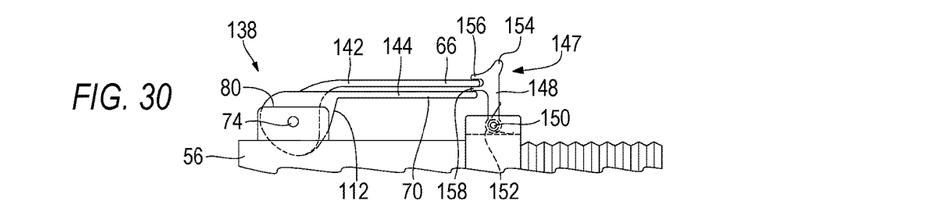
FIG. 30 is a side elevation view of the double cam lever of an alternative embodiment of the present invention.

Turning to FIGS. 26, 28 and 30, therein is shown an alternative embodiment 138 of an improved cam lock fitting of the present invention shown mounted on a female end portion 56. Shown therein is the inside 100 of the female coupling 56 along with the double cam levers 142, 144 mounted on an axle 74 in a side-by-side relationship which axle is also mounted on the bosses 78, 80 of the female coupling 56. Note that the openings 88 are sized and shaped to accommodate movement of the cam lobes 68, 72 of the double levers 142, 144 of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80 are attached onto the outside of the female coupling 56 in the conventional manner. It is expected that cam lever 142 would have the larger cam lobe 68 thereon relative to the cam lobe 72 but one skilled in the art would understand that these could be reversed. Alternative embodiment 138 shows a cam member 144 disposed adjacent a first boss 80, wherein a spacer 146 is disposed on the axle 74 adjacent the second boss 78, wherein the first cam member 142 is disposed between the other cam member 144 and the spacer 146. FIG. 28 shows the ear or arm portion 66 of lever 142 being larger and disposed over ear portion 144 so that the ear or arm portion 66 of lever 142 is outside relative to ear portion 70 of lever 144 as best shown in FIG. 30. Thus, lever 142 may be referred to as an outer lever and lever 144 as an inner lever. In order to accomplish this the neck area between the cam lobe portion and the arm/lever portion may be extended from or more vertically angled relative to housing 56 and some experimentation may be necessary to find the optimum length or angle for the neck areas. The lever arm portion 66 of the outer cam ear 142 is larger, i.e., wider, than the lever portion 70 of the inner cam ear 144 so that it will be easier to grasp in the hands of an operator; also, the inner cam ear is not intended to be opened until after the outer cam ear is opened and having a wider outer ear helps accomplish this objective. A cylindrical spacer 146 is also shown mounted on the axle so as to cause the larger cam lever 142 to be precisely aligned with its corresponding larger cam lever 142 mounted on the opposite side of the female coupling 56 so as to balance all structural torques and forces so as to prevent warping of the housing 56 or axle 74 which may occur with conventional designs over a period of time. FIG. 30 shows an optional latch mechanism 147 useful for embodiment 138 including a latch arm or lever 148 which moves on a pivot 150 disposed on a pair of mounts 166 which lever is biased closed by spring 152. Also shown is thumb grip 154 to allow a user to actuate the lever 148 along with a first catch 156 for the larger ear 142 and a second catch 158 for smaller ear 144. In operation, the latch lever arm 148 must be moved from the closed position to an open position before the cam levers 142, 144 can be operated. Previously disclosed elements may also be shown.

Figure 27:
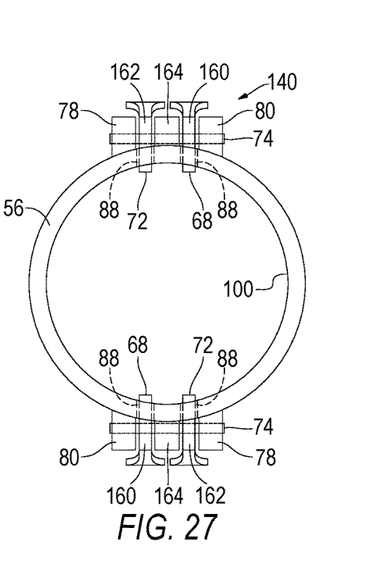
FIG. 27 is an end elevation view of the double cam levers taken from the front of portions of an alternative embodiment of the present invention.
Figure 29:
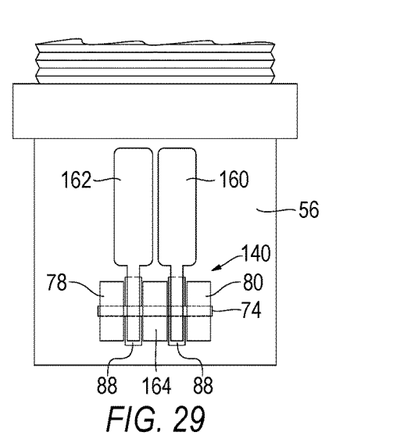
FIG. 29 is a top view of the double cam lever of an alternative embodiment of the present invention.

Turning to FIGS. 27 and 29, therein is shown an alternative embodiment 140 of an improved cam lock fitting of the present invention shown mounted on a female end portion 56. Shown therein is the inside 100 of the female coupling 56 along with the double cam levers 160, 162 mounted on an axle 74 in a side-by-side relationship which axle is also mounted on the bosses 78, 80, and 164 of the female coupling 56. Note that the openings 88 are sized and shaped to accommodate movement of the cam lobes 68, 72 of the double levers 160, 162 of the present invention; also, it should be clear that the lobes and levers could have many shapes and thicknesses other than those which are illustrated so long as they are effectively sized and shaped to accomplish the teachings of the present invention all of which would be understood by one skilled in the art. The bosses 78, 80, and 164 are attached onto the outside of the female coupling 56 in the conventional manner. It is expected that cam lever 160 would have the larger cam lobe 68 thereon relative to the cam lobe 72 but one skilled in the art would understand that these could be reversed. FIG. 29 shows the ear or arm portion 66, 70 disposed in a side-by-side relationship with cam member 160 disposed between boss 80 and boss 164 and cam member 162 disposed between boss 78 and boss 164. The cam member 160, 162 are precisely aligned with its corresponding cam member on the opposite side of the female coupling 56 so as to balance all structural torques and forces so as to prevent warping of the housing 56 or axle 74 which may occur with conventional designs over a period of time. Having the third boss 164 assures that all structural torques and forces are balanced so as to prevent warping of the housing 56 or axle 74. FIG. 30 shows an optional latch mechanism 147 useful for embodiment 140 including a latch arm or lever 148 which moves on a pivot 150 which pivot is biased closed by spring 152. Also shown is thumb grip 154 to allow a user to actuate the lever 148 along with a first catch 156 or catch 158. In operation, the latch lever arm 148 must be moved from the closed position to an open position before the cam levers 160, 162 can be operated. Alternatively, the latch mechanism 113 disclosed in FIGS. 20-24 could be easily adapted for use with cam members 160, 162. Previously disclosed elements may also be shown.

By way of additional summary and with reference to FIGS. 1-30, the present invention may be described as a cam lock fitting 54, a) having a male conduit 58 having an end 60 thereon and an external peripheral groove 86 adjacent the end, b) having a female conduit 56 for receiving the male conduit and having a pair of opposed side openings 88 opposite the external peripheral groove, c) sealing at 98 between the end of the male conduit and the female conduit, d) having a first and second pair of cam members, each pair having first (outer) 62 and second (inner) 64 cam members so that there are a total of four cam members, a pair, i.e., two, of the cam members being pivotally disposed on opposite sides of the female conduit, each cam member having a lever portion 66, 70 lying adjacent the female conduit and a cam portion 68, 72 with a larger or more effectively sized or shaped cam portion on the first (outer) cam member 62, wherein the cam portions pass through the side openings and engage the external peripheral groove when the lever portion lies adjacent the female conduit in a first, closed position (see FIGS. 8 and 11), each lever portion being outwardly moveable away from the female conduit to a second, open position to disengage the cam portions from the external peripheral groove (see FIGS. 10 and 13), e) the male and female conduits being connected thereby preventing leakage therebetween when each of the lever portions are in the first position (see FIGS. 8 and 11); and, f) the male and female conduits being slightly separated, i.e., are loose fit, thereby allowing leakage therebetween when the lever portions of the first cam members are in the second position and the lever portions of the second cam members are in the first position (see FIGS. 9 and 12), wherein if leakage is observed by an operator the lever portions of the first cam members are moved back to the first position to permit the male and female conduits to be reconnected.

Further, wherein the cam portions of the second cam members are forked (see FIG. 19), the forks having a space 110 therebetween, wherein the cam portions of the first cam members are pivotally disposed in a respective space wherein the first and second cam members pivot on a first axle 74, or, wherein the first cam members pivot on a first axle 74 and the second cam members pivot on a second axle 90. In an alternative embodiment, the inner cam lever 64 is larger than the outer cam lever 62. Also having a latching mechanism 113 having retaining protrusions 128, 130 mounted adjacent each of the side openings and a pin housing 122 attached to each lever portion of each cam member, a spring 132 loaded pin 118 within each pin housing which urges a distal end 124 of the pin into engagement with one of the retaining protrusions to prevent each of the lever portions from being moved from the closed position to the open position, and a pull member 114, or the like, attached to a proximal end 116 of the pins to allow an operator to withdraw the pin from engagement with a retaining protrusion allowing each lever portion to be moved from the closed position to the open position.

Alternative embodiment 138 shows a cam member 144 disposed adjacent a first boss 80, wherein a spacer 146 is disposed on the axle 74 adjacent the second boss 78, wherein the first cam member 142 is disposed between the other cam member 144 and the spacer 146. Alternative embodiment 140 shows the first cam member 160 disposed between the first 80 and second boss 154, wherein the second cam member 162 is disposed between said second 154 and third boss 78. A latch mechanism 147 could be used with embodiment 138 or 140.

We claim:

1. A safety cam lock fitting, comprising:
   a) a male and a female conduit, said male and female conduits adapted for being connected to each other, said male conduit having an end thereon and an external peripheral groove adjacent said end, said female conduit having an end thereon and an internal seal disposed therein adjacent said end, wherein said end of said male conduit contacts said seal of said female conduit thereby preventing leakage when said male and female conduits are connected to each other;
   b) a first and a second pair of cam members, each pair having first and second cam members, a pair of said cam members being pivotally disposed on an axle extending between first and second bosses on opposite sides of said female conduit, each said cam member having a lever portion and a cam portion, wherein each said cam portion is adapted to pivot through an opening in a wall of said female conduit and into said external peripheral groove so as to removably join said male conduit to said female conduit, wherein each said cam member has a closed position when said male and female conduits are connected to each other and an open position when said male and female conduits are disconnected from each other;
   c) wherein said cam portion of each said first cam member is larger than said cam portion of each said second cam member, wherein said second cam member is disposed adjacent said first boss, wherein a spacer is disposed on said axle adjacent said second boss, wherein said first cam member is disposed between said second cam member and said spacer; and
   d) wherein said male and female conduits have a partially open position in which said male and female conduits are slightly separated from each other thereby allowing leakage between said male and female conduits when each said first cam member is in said open position and each said second cam member is in said closed position, wherein if said leakage is observed by an operator each said first cam member is pivotable back to said closed position to permit the male and female conduits to be reconnected to each other.

2. The safety cam lock fitting of claim 1, wherein said cam portion of each said first cam member effectively conforms to said external peripheral groove better than said cam portion of each said second cam member to permit the male and female conduits to be connected to each other.

3. The safety cam lock fitting of claim 1, wherein said lever portion of said first cam member is larger than said lever portion of said second cam member.

4. The safety cam lock fitting of claim 1, wherein said lever portion of said first cam member is disposed over and outside said lever portion of said second cam member.

5. The safety cam lock fitting of claim 1, further comprising a latch being disposed on said female conduit, wherein when said lever portion of each said first and second cam member is moved from said open position into said closed position said lever portion is latched in said closed position, wherein said latch is unlatchable to allow said lever portion to be moved from said closed position to said open position.

6. The safety cam lock fitting of claim 5, wherein each said latch comprises a latch arm pivotally mounted on an outside of said female conduit, said latch being biased toward a closed position, a first and second catch disposed on said arm so as to contact a distal end of each said first and second lever portion when said latch is in said closed position to prevent each of said lever portion from being moved from said closed position to said open position.

7. The safety cam lock fitting of claim 1, wherein said cam portion of each said second cam member is larger than said cam portion of each said first cam member, wherein said male conduit has a partially open position in which said male and female conduits are slightly separated from each other thereby allowing leakage between said male and female conduits when each said second cam member is in said open position and each said first cam member is in said closed position, wherein if said leakage is observed by an operator each said second cam member is pivoted back to said closed position to permit the male and female conduits to be reconnected to each other.

8. A method for assembling a safety cam lock fitting, comprising the steps of:
   a) providing a male and a female conduit adapted for connection to each other, the male conduit having an end thereon and an external peripheral groove adjacent the end, the female conduit having an end thereon and an internal seal disposed therein adjacent the end, wherein the end of the male conduit contacts the seal of the female conduit thereby preventing leakage when the male and female conduits are connected to each other;
   b) providing a first and a second pair of cam members, each pair having first and second cam members, pivotally disposing a pair of the cam members on an axle extending between first and second bosses on opposite sides of the female conduit, each cam member having a lever portion and a cam portion, adapting each cam portion to pivot through an opening in a wall of the female conduit and into the external peripheral groove so as to removably join the male conduit to the female conduit, wherein each cam member has a closed position when the male and female conduits are connected to each other and an open position when the male and female conduits are disconnected from each other;
   c) configuring the cam portion of each first cam member to be larger than the cam portion of each second cam member, wherein the second cam member is disposed adjacent the first boss, wherein a spacer is disposed on the axle adjacent the second boss, wherein the first cam member is disposed between the second cam member and the spacer; and
   d) wherein the male and female conduits have a partially open position in which the male and female conduits are slightly separated from each other thereby allowing leakage between the male and female conduits when each first cam member is in the open position and each second cam member is in the closed position, wherein if leakage is observed by an operator each first cam member is pivotable back to the closed position to permit the male and female conduits to be reconnected to each other.

9. The method of claim 8, wherein the cam portion of each first cam member effectively conforms to the external peripheral groove better than the cam portion of each second cam member to permit the male and female conduits to be connected to each other.

10. The method of claim 8, wherein the lever portion of the first cam member is larger than the lever portion of the second cam member.

11. The method of claim 8, wherein the lever portion of the first cam member is disposed over and outside the lever portion of the second cam member.

12. The method of claim 8, further comprising the step of providing a latch on the female conduit, wherein when the lever portion of each first and second cam member is moved from the open position into the closed position the lever portion is latched in the closed position, wherein the latch is unlatchable to allow the lever portion to be moved from the closed position to the open position.

13. The method of claim 12, wherein each latch includes a latch arm pivotally mounted on an outside of the female conduit, the latch being biased toward a closed position, a first and second catch disposed on the latch arm so as to contact a distal end of each first and second lever portion when the latch is in the closed position to prevent each of the lever portions from being moved from the closed position to the open position.

14. The method of claim 8, wherein the cam portion of each second cam member is larger than the cam portion of each first cam member, wherein the male conduit has a partially open position in which the male and female conduits are slightly separated from each other thereby allowing leakage between the male and female conduits when each second cam member is in the open position and each first cam member is in the closed position, wherein if leakage is observed by an operator each second cam member is pivoted back to the closed position to permit the male and female conduits to be reconnected to each other.

15. A safety cam lock fitting, comprising:
a) a male and a female conduit, said male and female conduits adapted for being connected to each other, said male conduit having an end thereon and an external peripheral groove adjacent said end, said female conduit having an end thereon and an internal seal disposed therein adjacent said end, wherein said end of said male conduit contacts said seal of said female conduit thereby preventing leakage when said male and female conduits are connected to each other;
b) a first and a second pair of cam members, each pair having first and second cam members, a pair of said cam members being pivotally disposed on an axle extending between first, second, and third bosses on opposite sides of said female conduit, each said cam member having a lever portion and a cam portion, wherein each said cam portion is adapted to pivot through an opening in a wall of said female conduit and into said external peripheral groove so as to removably join said male conduit to said female conduit, wherein each said cam member has a closed position when said male and female conduits are connected to each other and an open position when said male and female conduits are disconnected from each other;
c) wherein said cam portion of each said first cam member is larger than said cam portion of each said second cam member, wherein said first cam member is disposed between said first and second boss, wherein said second cam member is disposed between said second and third boss; and
d) wherein said male and female conduits have a partially open position in which said male and female conduits are slightly separated from each other thereby allowing leakage between said male and female conduits when each said first cam member is in said open position and each said second cam member is in said closed position, wherein if said leakage is observed by an operator each said first cam member is pivotable back to said closed position to permit the male and female conduits to be reconnected to each other.

16. The safety cam lock fitting of claim 15, wherein said cam portion of each said first cam member effectively conforms to said external peripheral groove better than said cam portion of each said second cam member to permit the male and female conduits to be connected to each other.

17. The safety cam lock fitting of claim 15, further comprising a latch being disposed on said female conduit, wherein when said lever portion of each said first and second cam member is moved from said open position into said closed position said lever portion is latched in said closed position, wherein said latch is unlatchable to allow said lever portion to be moved from said closed position to said open position.

18. The safety cam lock fitting of claim 15, wherein said cam portion of each said second cam member is larger than said cam portion of each said first cam member, wherein said male conduit has a partially open position in which said male and female conduits are slightly separated from each other thereby allowing leakage between said male and female conduits when each said second cam member is in said open position and each said first cam member is in said closed position, wherein if said leakage is observed by an operator each said second cam member is pivoted back to said closed position to permit the male and female conduits to be reconnected to each other.

\* \* \* \* \*